United States Patent
Sato et al.

(10) Patent No.: US 7,780,887 B2
(45) Date of Patent: Aug. 24, 2010

(54) GOLF BALL AND DIE FOR MOLDING THE SAME

(75) Inventors: Katsunori Sato, Chichibu (JP); Atsushi Mitamura, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 1 day.

(21) Appl. No.: 11/960,132

(22) Filed: Dec. 19, 2007

(65) Prior Publication Data

US 2009/0160088 A1   Jun. 25, 2009

(51) Int. Cl.
*B29C 45/14* (2006.01)

(52) U.S. Cl. .................. 264/162; 425/116; 425/577

(58) Field of Classification Search .................. 425/116, 425/577, DIG. 249; 249/103; 264/162; 451/28
See application file for complete search history.

(56) References Cited

U.S. PATENT DOCUMENTS

| | | | | |
|---|---|---|---|---|
| 5,566,943 A | * | 10/1996 | Boehm ......................... | 473/378 |
| 5,874,038 A | * | 2/1999 | Kasashima et al. ........... | 425/116 |
| 6,050,803 A | * | 4/2000 | Omura et al. ................ | 425/116 |
| 6,238,194 B1 | * | 5/2001 | Inoue et al. .................. | 425/116 |
| 6,379,138 B1 | * | 4/2002 | Puniello et al. .............. | 425/116 |
| 2003/0054902 A1 | * | 3/2003 | Masutani ...................... | 473/351 |
| 2006/0082020 A1 | * | 4/2006 | Veilleux et al. .............. | 264/259 |
| 2007/0026971 A1 | * | 2/2007 | Aoyama et al. .............. | 473/378 |

FOREIGN PATENT DOCUMENTS

| | | | |
|---|---|---|---|
| JP | 63-99884 A | | 5/1988 |
| JP | 2000271250 A | * | 10/2000 |
| JP | 2003-111868 A | | 4/2003 |
| JP | 2007268265 A | * | 10/2007 |

\* cited by examiner

*Primary Examiner*—Robert B Davis
(74) *Attorney, Agent, or Firm*—Sughrue Mion, PLLC

(57) ABSTRACT

There are provided a golf ball in which the depths of dimples after grinding, which greatly affect the trajectory of golf ball, can be controlled readily and exactly, and a golf ball molding die for manufacturing the golf ball. The golf ball molding die in accordance with the present invention comprises two die bodies in which a cavity for molding a golf ball is formed by joining the die bodies to each other; and a protrusion formed on the cavity side surface of at least one of the die bodies, the protrusion having a uniform height from the surface or an imaginary spherical surface on which the protrusion is assumed to be absent toward the center of the cavity, wherein when a parting line is at latitude zero degree, the protrusion is arranged in the range of from latitude about 10 degrees to latitude about 80 degrees.

16 Claims, 3 Drawing Sheets

US 7,780,887 B2

GOLF BALL AND DIE FOR MOLDING THE SAME

BACKGROUND OF THE INVENTION

The present invention relates to a golf ball and a die for molding the golf ball.

A golf ball is usually manufactured by coating a core material thereof with a cover layer by using a die. This die is provided with support pins and vent pins. Also, the die includes an upper die and a lower die, which are joined to each other at a parting line. The support pins, vent pins, and parting line produce burrs on the surface of golf ball. The burrs must be removed by grinding, because they may greatly impair the aerodynamic characteristics of golf ball.

If the surface of golf ball, i.e., the surface of cover layer is ground for removing burrs, the dimples formed on the surface of cover layer each must have a specified depth. Therefore, the depths of dimples are measured repeatedly so that the dimples each have a specified depth while the surface of cover layer is ground.

The depth of dimple is usually measured by using a depth micrometer or similar instruments. However, this measuring procedure has a problem that it requires very much time, because the dimple has a shape curved inward. Also, a problem arises in that unless the surface of golf ball is ground properly so that the dimples each have a specified depth, the golf ball does not fly along a desired trajectory.

Japanese Patent Application Publication No. 63-99884 describes a method comprising forming two kinds of depressions having different depths on the surface of golf ball, and then grinding the surface of golf ball until the depressions having a shallower depth disappear. According to this method, a proper grinding quantity can be determined merely by visually observing the depressions.

Japanese Patent Application Publication No. 2003-111868 describes a method comprising forming a depression having three different depths on the surface of golf ball, and then grinding the surface of golf ball. According to this method, the grinding quantity can be readily determined by visually observing the depression, because the number of the steps in the depression which are produced by different depths is changed depending on the grinding quantity.

However, these technique described in the above-mentioned documents may impair the aerodynamic characteristics of golf ball, because deep depressions should be formed on the surface of golf ball. Also, an exact grinding quantity cannot be readily measured by these methods described in the above-mentioned documents, though a rough grinding quantity can be determined by them. Therefore, the exact depth of dimple after grinding cannot be readily measured or controlled by these techniques.

SUMMARY OF THE INVENTION

Accordingly, an object of the present invention is to provide a golf ball in which the depths of dimples after grinding, which greatly affect the trajectory of golf ball, can be controlled readily and exactly, and a golf ball molding die for manufacturing the golf ball.

To achieve the above object, a first aspect of the present invention provides a die for molding a golf ball, comprising two die bodies in which a cavity for molding a golf ball is formed by joining the die bodies to each other; and a protrusion formed on the cavity side surface of at least one of the die bodies, the protrusion having a uniform height from the surface or an imaginary spherical surface on which the protrusion is assumed to be absent toward the center of the cavity, wherein when a parting line is at latitude zero degree, the protrusion is arranged in the range of from latitude about 10 degrees to latitude about 80 degrees.

At least one protrusion may be formed on the surface of each of the two die bodies. Two or more protrusions may be formed on the surface of at least one of the two die bodies. The two or more protrusions may be formed at equal spaces at the same latitude. The protrusion may be arranged in the range of from latitude about 30 degrees to latitude about 60 degrees.

The protrusion can be high enough that the depression formed on the surface of golf ball by the protrusion does not disappear by properly grinding the surface of golf ball. The height of the protrusion can be in the range of from about 5 μm to about 0.1 mm. The protrusion can have a shape of a letter or sign.

A second aspect of the present invention provides a golf ball manufactured by the die described below. This golf ball molding die comprises two die bodies in which a cavity for molding a golf ball is formed by joining the die bodies to each other; and a protrusion formed on the cavity side surface of at least one of the die bodies, the protrusion having a uniform height from the surface or an imaginary spherical surface on which the protrusion is assumed to be absent toward the center of the cavity, wherein when a parting line is at latitude zero degree, the protrusion is arranged in the range of from latitude about 10 degrees to latitude about 80 degrees.

A third aspect of the present invention provides a golf ball comprising dimples formed on the surface of the golf ball; and a depression formed on the surface of the golf ball, the depression having a uniform depth from the surface of the golf ball or an imaginary spherical surface on which the depression is assumed to be absent toward the center of the golf ball, wherein when a parting line of the golf ball is at latitude zero degree, the depression is arranged in the range of from latitude about 10 degrees to latitude about 80 degrees.

According to the present invention, in grinding the surface of golf ball, the poor workability of measurement of grinding quantity can be improved, and also the grinding quantity can be measured exactly. Further, the depths of dimples can be calculated from the grinding quantity with high accuracy, so that the depths of dimples after grinding, which greatly affect the trajectory of golf ball, can be controlled readily and exactly. Therefore, according to the present invention, a golf ball that flies along a proper trajectory can be manufactured stably and easily.

DESCRIPTION OF THE PREFERRED EMBODIMENTS

One embodiment of the present invention will now be described with reference to the accompanying drawings. As a specific example, a case is explained in which a two-piece solid golf ball is manufactured by molding a cover layer around a rubber-made elastic body, which is a core material, by injection molding. The present invention is not limited to this embodiment, and can be applied to other types of gall balls.

Figure 1:
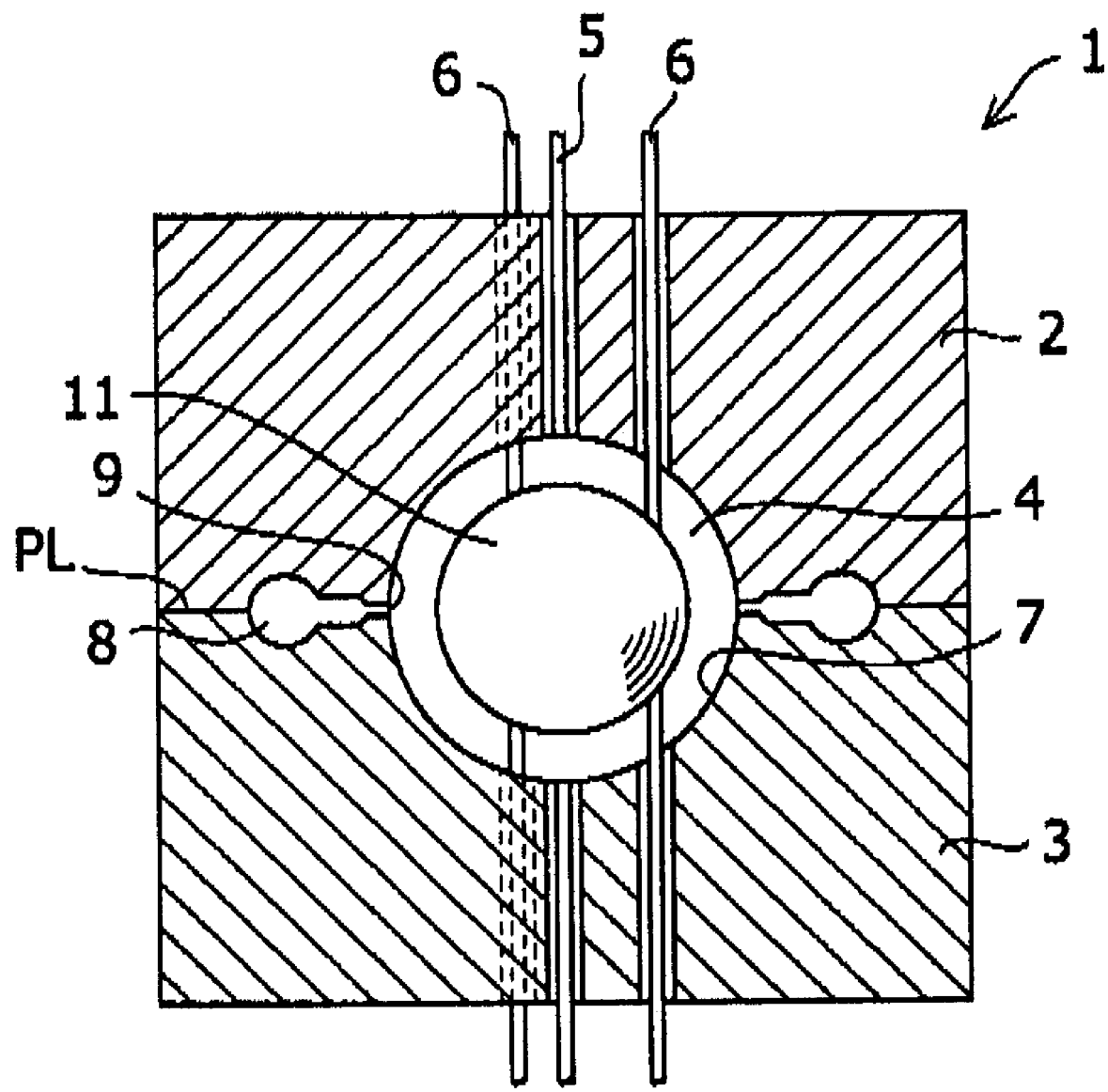
FIG. 1 is a sectional view of a golf ball molding die in accordance with one embodiment of the present invention.

As shown in FIG. 1, when the golf ball is manufactured by the injection molding, an injection molding die 1 is used. This injection molding die 1 includes an upper die 2 and a lower die 3, which are made of a metal. By separably joining the upper die 2 and the lower die 3 to each other, a spherical cavity 4 is formed in the die 1.

Figure 2:
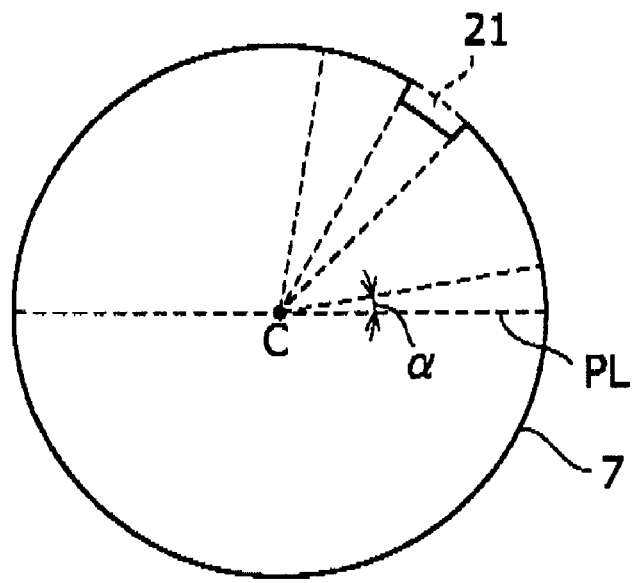
FIG. 2 is a schematic view of a cavity in the die shown in FIG. 1.

A parting line PL of the upper die 2 and the lower die 3 is located at a position corresponding to the equator, that is, latitude zero degree of the cavity. On the cavity wall surface 7 of the molding die 1, a large number of convex parts (not shown) are provided to form dimples on the surface of the cover layer. Also, on the cavity wall surface 7, a protrusion (not shown) is provided to form a depression on the surface of golf ball, which is used to measure the grinding quantity when the surface of golf ball is ground. This protrusion is explained in more detail with reference to FIG. 2. In FIG. 2, which is not drawn to scale, the protrusion is drawn enlargedly with respect to the cavity for easily explaining the configuration of protrusion.

As shown in FIG. 2, a protrusion 21 is formed on the cavity wall surface 7 of the die 1. This protrusion 21 is formed so as to have a uniform height toward the center C of the cavity 4 from the cavity wall surface 7 or an imaginary spherical surface indicated by a broken line. The uniform height of the protrusion 21 produces a uniform depth of a depression formed on the surface of golf ball. Therefore, the grinding quantity can be measured readily and exactly by using a depth micrometer or similar instruments.

The protrusion 21 has a height such that the depression formed in the surface of golf ball by the protrusion does not disappear when the surface of golf ball is ground properly. Specifically, the lower limit of the height of the protrusion 21 is preferably about 5 μm, further preferably about 10 μm. Also, the upper limit of the height of the protrusion 21 is preferably about 0.1 mm, further preferably about 30 μm. A height of the protrusion 21 exceeding about 0.1 mm is unpreferable because an excessively deep depression is formed on the surface of golf ball, and thereby an adverse influence may be exerted on the trajectory of golf ball.

The position at which the protrusion 21 is arranged can be represented by latitude α. In this specification, the latitude α is represented with the parting line PL, at which the upper die 2 and the lower die 3 of the die 1 are joined to each other, being latitude zero degree. Also, the latitude α is represented by a positive value for both of the upper die 2 and the lower die 3. The protrusion 21 is arranged in the range of from latitude about 10 degrees to latitude about 80 degrees. By arranging the protrusion 21 in this range, the influence of burrs formed by pins near the North Pole and South Pole or burrs formed by the parting line at the equator is avoided, by which a depression having a desired depth can be formed in the surface of golf ball accurately. Therefore, the grinding quantity can be measured exactly, and the depths of dimples can be controlled exactly. The protrusion 21 is preferably formed at a position of latitude about 30 degrees or higher. Also, the protrusion 21 is preferably formed at a position of latitude about 60 degrees or lower.

FIG. 2 illustrates the protrusion 21 formed only on the upper die 2. However, the protrusion 21 can also be formed on the lower die 3 in the same manner. Also, FIG. 2 illustrates only one protrusion 21. However, two or more protrusions can be formed on the upper die 2 or the lower die 3. In this case, a plurality of protrusions 21 are preferably formed at positions of the same latitude α. Thereby, a plurality of depressions are formed at positions of the same latitude of golf ball, so that the grinding quantity can be measured exactly. Also, the protrusions 21 are preferably formed at equal spaces at the same latitude α. Thereby, the plurality of depressions are formed at equal spaces at the same latitude, so that the grinding quantity can be measured exactly over the whole surface of golf ball, and also the grinding error can be reduced.

Preferably, the shape of the flat part at the tip end of the protrusion 21 can be, but is not limited to, slender so that the depth of the depression formed in the surface of golf ball can be measured easily. For example, the shape of the protrusion 21 can be made a shape of a letter or sign. Also, the shape of the protrusion 21 is preferably a shape of a letter or sign having symmetry such as line symmetry or point symmetry. By the provision of symmetry, the grinding quantity can be measured exactly, and also the grinding error can be reduced.

In the cavity wall surface 7, a gas vent pin 5 for venting gas is provided at the North Pole point and the South Pole point, that is, at positions of latitude 90 degrees of the cavity 4. Also, in the cavity wall surface 7, a plurality of support pins 6 for supporting a core material 11 are provided at positions such as to be capable of stably supporting the core material 11 of golf ball so as to be capable of advancing and retreating.

In the die 1, a ring-shaped runner 8 is provided so as to surround the equator of the cavity 4. A plurality of molding material injection gates 9 that are open to the interior of the cavity 4 are provided at equal spaces along the circumferential direction in an inner peripheral part of the ring-shaped runner 8. Such a die can be manufactured by using a method for directly cutting out three-dimensionally or by the electrical discharge machining by using 3DCAD or CAM.

According to the configuration of the die 1 explained above, first, as shown in FIG. 1, the core material 11 of golf ball is placed between the upper die 2 and the lower die 3, and the upper die 2 and the lower die 3 are joined to each other to form the cavity 4. The core material 11 is supported at the central part by the support pins 6, and then a cover material whose main component is a thermoplastic resin is injected into the cavity 4 through the molding material injection gates 9. The cover material flows in a void part between the core material 11 and the cavity wall surface 7, and joins at the North Pole point and the South Pole point of the cavity 4, by which the whole surface of the core material 11 is coated with the cover material.

Air that is present in the clearance between the core material 11 and the cavity wall surface 7 and a gas such as a volatile component released mixedly with a resin are discharged to the outside of the die 10 via the gas vent pin 5. By the above-described process, the rubber-made elastic body, which is the core material 1, is covered with the cover layer 5, by which a golf ball formed with a plurality of dimples on the surface of the cover layer 5 is manufactured.

Figure 3:
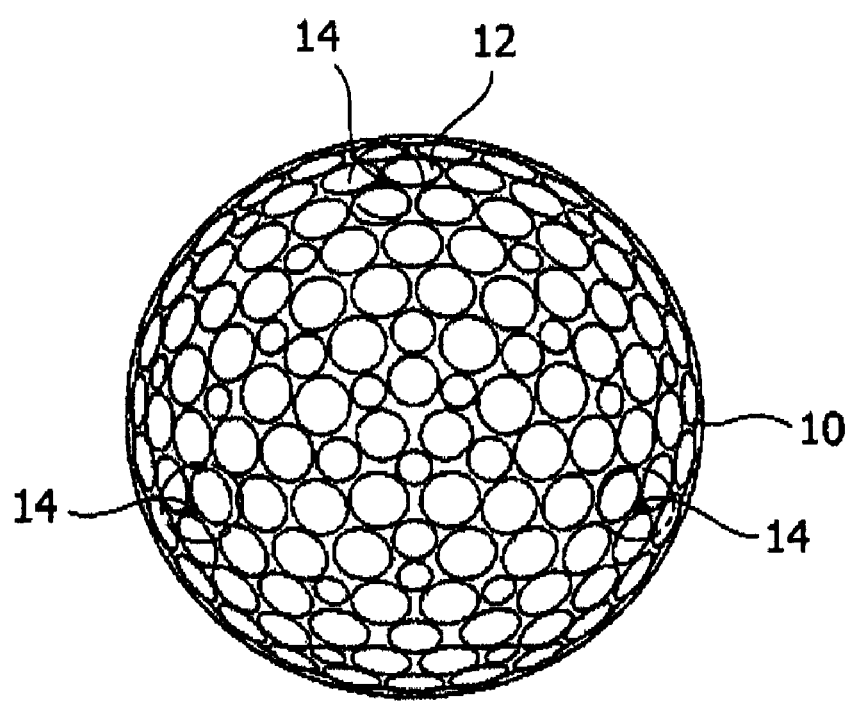
FIG. 3 is a perspective view of a golf ball in accordance with one embodiment of the present invention.

FIG. 3 shows one example of a golf ball molded as described above. On the surface of a golf ball 10 formed with the cover layer on the core material, a plurality of dimples 12 are formed. As shown in FIG. 3, each of the dimples 12 has a shape that is circular in plan view and depressed so as to be curved to the center side. However, the shape of the dimple 12 is not limited to this shape. The dimple 12 can have an elliptical shape or polygonal shape in plan view, or can have a shape such as to be curved in two stages to the center side.

On the surface of the golf ball 10, depressions 14 for measuring the grinding quantity are formed at positions between the dimples 12. The depression 14 is formed by the protrusion 21 of the die 10. The depression 14 has a fixed depth from the surface of golf ball or the imaginary spherical surface drawn assuming that the depression is absent toward the center of golf ball. For example, the lower limit of the depth of the depression 14 is preferably about 5 μm, further preferably about 10 μm. The upper limit of the depth of the depression 14 is preferably about 0.1 mm, further preferably about 30 μm. Also, when the parting line of the golf ball 10 is assumed to be at latitude zero degree, the depressions are located in the range of from latitude about 10 degrees to latitude about 80 degrees. The preferable range is from latitude about 30 degrees to latitude about 60 degrees.

The parting line of golf ball is usually straight along the equator of golf ball. In this case, usually, the dimples are not formed on the parting line. Therefore, the parting line can be found from the appearance of golf ball. The present invention can be applied to a golf ball in which the parting line has a waveform shape along the equator of golf ball. In this case, the positions corresponding to the North Pole and the South Pole of die are made latitude 90 degrees, and with these positions being a reference, the position of latitude zero degree is made a parting line.

Figure 4:
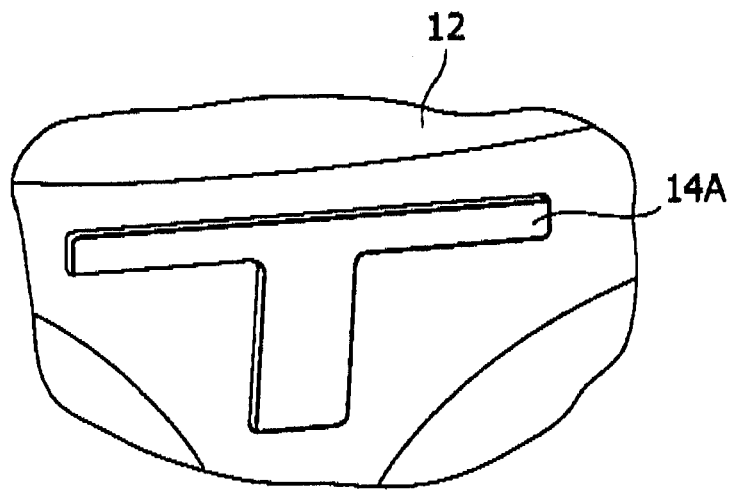
FIG. 4 is an enlarged perspective view showing one example of a depression on the golf ball shown in FIG. 3.
Figure 5:
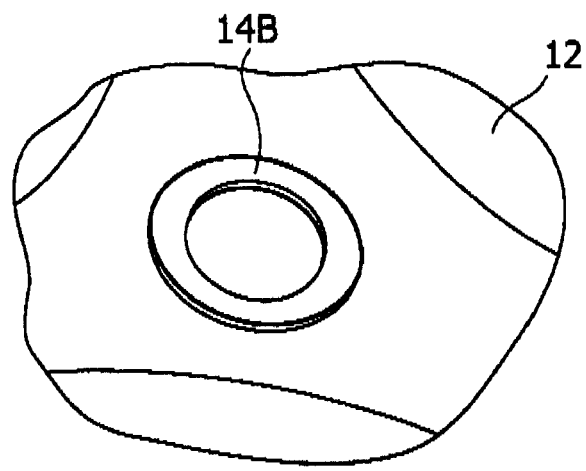
FIG. 5 is an enlarged perspective view showing another example of a depression on the golf ball shown in FIG. 3.
Figure 6:
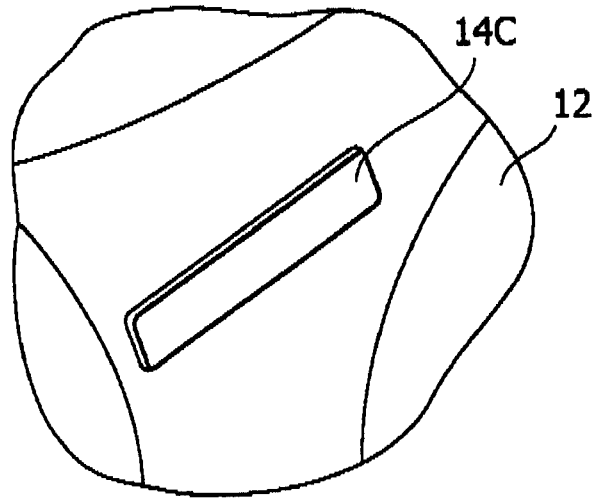
FIG. 6 is an enlarged perspective view showing still another example of a depression on the golf ball shown in FIG. 3.

FIGS. 4 to 6 show specific examples of the depression 14 formed on the surface of the golf ball 10. In FIG. 4, a depression 14A having a T shape is formed. In FIG. 5, an O-shaped or round sign shaped depression 14B is formed. In FIG. 6, I-shaped or minus sign shaped depression 14C is formed. The shape of the depression 14 is not limited to these shapes, and a shape such as a shape of letter such as H or a shape of any other sign can be adopted.

To remove burrs etc. formed on the surface of golf ball, the whole surface of the golf ball 10 is ground. As the grinding method, the conventional grinding method can be used. The grinding quantity can be calculated from the depth at the start of formation of depression by measuring the depth of the depression 14 by using a depth micrometer etc. Since the depth of the depression 14 is fixed at all locations of the depression 14 as described above, the grinding quantity can be measured easily and exactly. Also, since the depth of the depression 14 is formed accurately, the grinding quantity can be calculated with high accuracy by measuring the depth of depression.

The above is an explanation of a specific embodiment of the golf ball molding die in accordance with the present invention and the golf ball manufactured by the die. The present invention is not limited to the above-described embodiment, and all changes and modifications apparent to those skilled in the art are embraced in the technical scope of the present invention.

What is claimed is:

1. A die for molding a golf ball, comprising:
    two die bodies in which a cavity for molding a golf ball is formed by joining the die bodies to each other;
    a protrusion formed on the cavity side surface of at least one of the die bodies, the protrusion having a uniform height from the surface or an imaginary spherical surface on which the protrusion is assumed to be absent toward the center of the cavity; and
    a plurality of dimple forming projections, wherein the protrusion is formed at a position between the plurality of dimple forming projections in order to form a depression which is used for measuring a grinding quantity of a surface of the golf ball, and
    wherein when a parting line is at latitude zero degree, the protrusion is arranged in the range of from latitude about 10 degrees to latitude about 80 degrees.

2. The die for molding a golf ball according to claim 1, wherein at least one protrusion is formed on the surface of each of the two die bodies.

3. The die for molding a golf ball according to claim 1, wherein two or more protrusions are formed on the surface of at least one of the two die bodies, and the two or more protrusions are formed at equal spaces at the same latitude.

4. The die for molding a golf ball according to claim 1, wherein the protrusion is arranged in the range of from latitude about 30 degrees to latitude about 60 degrees.

5. The die for molding a golf ball according to claim 1, wherein the protrusion is high enough that a depression formed on the surface of golf ball by the protrusion does not disappear by properly grinding the surface of golf ball.

6. The die for molding a golf ball according to claim 1, wherein the protrusion has a shape of a letter or sign.

7. The die for molding a golf ball according to claim 1, wherein the die is for molding a cover layer of a golf ball.

8. A method for manufacturing a golf ball, comprising:
    forming a golf ball by using the die according claim 1;
    grinding the entire surface of the golf ball obtained by the forming step; and
    calculating the grinding quantity of the grinding step by measuring the depth of a depression which is formed on the surface of the golf ball by the protrusion of the die.

9. A die for molding a cover layer of a golf ball, comprising:
    two die bodies in which a cavity for molding a golf ball is formed by joining the die bodies to each other;
    a protrusion formed on a cavity surface of at least one of the die bodies, the protrusion having a uniform height from the surface or an imaginary spherical surface on which the protrusion is assumed to be absent toward the center of the cavity, the uniform height ranging from about 5 μm to about 30 μm; and
    a plurality of dimple forming projections,
    wherein the protrusion is formed at a position between the plurality of dimple forming projections in order to form a depression which is used for measuring a grinding quantity of a surface of the golf ball, and
    wherein when a parting line is at latitude zero degrees, the protrusion is arranged in the range of from latitude about 10 degrees to latitude about 80 degrees.

10. The die for molding a golf ball according to claim 9, wherein at least one protrusion is formed on the surface of each of the two die bodies.

11. The die for molding a golf ball according to claim 9, wherein two or more protrusions are formed on the surface of at least one of the two die bodies, and the two or more protrusions are formed at equal spaces at the same latitude.

12. The die for molding a golf ball according to claim 9, wherein the protrusion is arranged in the range of from latitude about 30 degrees to latitude about 60 degrees.

13. The die for molding a golf ball according to claim 9, wherein the protrusion is long enough that a depression formed on the surface of golf ball by the protrusion does not disappear by properly grinding the surface of golf ball.

14. The die for molding a golf ball according to claim 9, wherein the protrusion has a shape of a letter or symbol.

15. The die for molding a golf ball according to claim 9, wherein the die is for molding a cover layer of a golf ball.

16. A method for manufacturing a golf ball, comprising:
    forming a golf ball by using the die according claim 9;
    grinding the entire surface of the golf ball obtained by the forming step; and
    calculating the grinding quantity of the grinding step by measuring the depth of a depression which is formed on the surface of the golf ball by the protrusion of the die.

* * * * *